UNITED STATES PATENT OFFICE.

LEO H. BAEKELAND, OF YONKERS, NEW YORK.

METHOD OF INDURATING FIBROUS AND CELLULAR MATERIAL.

949,671. Specification of Letters Patent. Patented Feb. 15, 1910.

No Drawing. Application filed February 18, 1907. Serial No. 358,156.

*To all whom it may concern:*

Be it known that I, LEO H. BAEKELAND, a citizen of the United States, residing at Yonkers, in the county of Westchester and State of New York, have invented certain new and useful Improvements in Methods of Indurating Fibrous and Cellular Materials, of which the following is a specification.

The object of this invention is to provide a method of indurating fibrous and cellular materials such as wood, wood-pulp, cotton, asbestos or the like, and imparting to the same additional strength and resistance to physical and chemical agents.

According to my invention there is produced synthetically within a fibrous body, and around the fibers or bundles of fibers constituting the same, a hard condensation product of phenols and formaldehyde. By the treatment of wood according to my method a soft or inferior wood can be transformed, either superficially or throughout its mass, into a material similar in character to the best grades of hard wood, and resembling mahogany, ebony, and the like.

The invention is based on the known fact that phenols and formaldehyde react under suitable conditions to yield solid condensation products. For instance ordinary phenol is capable of reacting with formaldehyde to produce a condensation product. This reaction is accelerated by the application of heat and by the presence of so-called condensing agents, as for instance mineral or organic acids, such as hydrochloric or tartaric acids, salts, as for example zinc chlorids and the like. In this particular instance an alcohol-soluble product may be obtained if the formaldehyde be not used in excess of the molecular proportion; if however formaldehyde be used in larger proportions a very hard and insoluble condensation product results. This latter product, in the absence of special coloring agents and as prepared from commercial materials, is usually yellow or brown in color, insoluble in all known solvents and inert in most chemical reagents, both acid and alkaline. It is infusible, but chars at temperatures considerably exceeding 300° C. Chemically it may be regarded in its simplest form as a polymerized oxybenzyl-methylen-glycol-anhydrid or its homologues. Either of these materials is suitable for the purposes of my invention.

In order to carry my method into effect I impregnate the wood or other fibrous material with the reacting bodies before the reaction has occurred, and I so arrange the conditions that the reaction yielding the condensation product occurs within the fibrous material. This can be accomplished in several ways. For instance a mixture of phenol or phenols with formaldehyde, with or without condensing agents, may be introduced into the fibrous material, and the reaction permitted to occur therein. If desired the reaction may be accelerated by the application of heat. The mixture may be applied to the surface of the wood or other fibrous material, or the material may be immersed in the mixture, or the known means for increasing penetration, as for instance vacuum and pressure, may be resorted to.

Instead of mixing the condensing agent with the reacting bodies or a mixture of them, the condensing agent may be applied afterward. For instance wood may be dipped in or painted with a mixture of phenol and formaldehyde and afterward painted with or dipped in an acid solution, or a solution of zinc chlorid or the like, which immediately starts the reaction. In cases in which a condensing agent is used it may be washed out after the reaction is complete, or it may be rendered harmless by the use of neutralizing agents. If for instance hydrochloric acid is employed as a condensing agent the impregnated material may be afterward soaked in water or in a slightly alkaline solution until the acid is removed or neutralized.

Instead of impregnating the wood or fibrous or cellular material with a mixture of reacting bodies, these may be introduced successively. For example the wood may be first impregnated with phenol, and thereafter subjected to the action of formaldehyde either as a gas or solution, the action being hastened if desired by the use of heat or condensing agents or by the simultaneous action of heat and condensing agents.

Heat may be applied in any of the usual ways, as for instance by the use of hot air, hot water or steam, each of these methods having its advantages or disadvantages in particular cases.

In case it is desired to indurate loose fibrous materials, as for instance wood-pulp, cotton, asbestos or the like, it may be necessary or desirable to subject the impregnated mass to pressure while the reaction is proceeding, in order to better insure its hardening or to determine a desired shape of the completed body. Special molds can be used for this purpose to obtain specified shapes, and the operation may be similar in some respects to the vulcanization of rubber products. The pressure may vary according to whether it is used merely for the purpose of preventing chemical dissociation or volatilization of the formaldehyde, or for giving a particular shape or configuration to the impregnated product. In the first case the pressure may be very slight, provided the heating of the impregnated product be started at sufficiently low temperatures. In some cases a pressure not exceeding fifteen pounds per square inch may be sufficient to counteract dissociation or volatilization, although ordinarily it is preferred to use a pressure of 50 to 100 pounds or more per square inch. If however the pressure be used for imparting a shape to the impregnated product, it becomes advisable to use much higher pressures, as those obtainable by the use of the lever press, screw press, hydraulic press or similar devices.

The method may be modified in various ways; for instance coloring agents or pigments may be introduced with the reacting bodies, before or after their application. Coloring agents may be mixed with the reacting bodies, or colors may be developed in or on the impregnated material by the action of appropriate agents. For instance oxidizing agents or alkaline compounds are found to darken the color of the impregnated wood or fiber. Instead of impregnating the whole mass of wood or fibrous material, the method may be so modified as to limit the impregnation to the outer portions, thus economizing the reagents and preserving the original character of the interior of the body, and yet hardening the outside to a sufficient extent for certain purposes. In case of white wood for instance such superficial impregnation will not only harden the wood but considerably increase its strength.

The wood may be dried or otherwise treated before being subjected to the indurating treatment; and after such treatment it should be further dried to expel the water which was formed during the reaction or which may have been introduced with the formaldehyde solution.

Wood or fibrous material treated in accordance with my method is not only improved in its physical character, but it is found to be more resistant to chemical action and atmospheric agents; its density is increased, and its electrical resistance is likewise considerably increased.

The results obtained by the method described are far superior to those secured by immersing the material in a solution of a gum or resin with subsequent drying. A mixture of phenol and formaldehyde possesses extraordinary penetrating qualities, far exceeding those of resinous solutions. No expense is involved for solvents. Furthermore as above stated it is possible to produce within the wood or like material condensation products which are totally insoluble and difficultly fusible, and which for these reasons could not be introduced into the body of the fibrous material by any known method.

Although the method may be carried out in the several modifications described above, I will give a specific example: Wood, for instance poplar, is impregnated with a liquid mixture of about equal volumes of ordinary commercial carbolic acid or cresol and commercial formaldehyde. The proportions of the latter may be varied in rather wide ranges; for instance, it may be used in double the amount of the carbolic acid, or be reduced to one-half of the amount of carbolic acid and yet give more or less satisfactory results. When an excess of formaldehyde or carbolic acid is used, this excess will be found in free condition after the reaction is over. In the liquid mixture described above I may dissolve some asphaltum, nigrosin or other suitable coal-tar dyes, so as to produce a darker color; or I may simply add some soluble iron salt, for instance ferric chlorid, which not only influences the color but, furthermore, acts as a condensing agent. The impregnated wood is now submitted to slow and progressive heating, preferably in a closed vessel. It is advantageous to start at moderate temperatures, say about 50° C., and then gradually increase to about 135° C. The heating must be continued until the synthesis has proceeded far enough, which can be determined easily by examining the wood from time to time and observing its increasing hardness and the thickening of the fluid. This may take from two hours to several days, according to whether the heat has been applied gradually or rapidly and according to the size of the pieces of wood treated. In the case of large blocks of wood the heat penetrates slowly and consequently the action is proportionately retarded. The same method of procedure is applied to loose fibrous or cellular materials, for instance, sawdust, wood pulp or asbestos, with this difference, however, that during the progressive action of heating the mass may be compacted and agglomerated by submitting the same to pressure in suitable molds. It should be borne in mind that inorganic fibrous materials like asbestos can stand a considerably higher heat in this treatment than wood or other organic fibrous materials. For instance, impregnated asbestos can be heated to as high as 200° C. without danger of destruction. For that reason the heating process can be carried on quicker and more thoroughly. During the act of heating in the air some superficial oxidation takes place which considerably darkens the color of the impregnated objects. This color can still further be developed by dipping the objects in a dilute solution of carbonate of sodium or other alkaline substance, or in oxidizing agents like chromate of potassium, and then afterward drying in air. In the same way a dark red color may be developed by applying lead peroxid.

I claim:

1. The method of indurating fibrous and cellular materials, which consists in impregnating the materials with a phenolic body and formaldehyde under conditions capable of producing by synthesis an indurating condensation product, and causing the same to react within the body of the material to yield said indurating condensation product.

2. The method of indurating wood which consists in impregnating the wood with a phenolic body and formaldehyde under conditions capable of producing by synthesis an indurating condensation product, and causing the same to react within the body of the wood to yield said indurating condensation product.

3. The method of indurating fibrous and cellular materials which consists in impregnating the materials with a phenolic body and formaldehyde under conditions capable of producing by synthesis an indurating condensation product, and causing the same to react under pressure within the body of the material to yield said indurating condensation product.

4. The method of indurating fibrous and cellular materials which consists in impregnating the materials with a phenolic body and formaldehyde under conditions capable of producing by synthesis an insoluble indurating condensation product, and causing the same to react within the body of the material to yield said indurating condensation product.

5. The method of indurating wood which consists in impregnating the wood with a phenolic body and formaldehyde under conditions capable of producing by synthesis an insoluble indurating condensation product, and causing the same to react within the body of the wood to yield said indurating condensation product.

6. The method of indurating fibrous and cellular materials which consists in impregnating the materials with a phenolic body and formaldehyde under conditions capable of producing by synthesis an insoluble indurating condensation product, and causing the same to react under pressure within the body of the material to yield said indurating condensation product.

7. The method of forming articles containing condensation products of phenols and formaldehyde, consisting in impregnating porous materials with phenols, subjecting the same to the action of formaldehyde under pressure in a closed receptacle, applying heat, maintaining the pressure of the gas sufficiently to prevent chemical dissociation of the forming condensation product, and continuing the operation until the infusible condensation product of phenols and formaldehyde is produced.

In testimony whereof, I affix my signature in presence of two witnesses.

LEO H. BAEKELAND.

Witnesses:
CHAS. H. POTTER,
E. G. FULLAM.